United States Patent
Knittel

(10) Patent No.: US 9,447,757 B2
(45) Date of Patent: Sep. 20, 2016

(54) METHOD FOR OPERATING AN AIR MASS SENSOR

(71) Applicant: Thorsten Knittel, Pentling (DE)

(72) Inventor: Thorsten Knittel, Pentling (DE)

(73) Assignee: Continental Automotive GmbH, Hannover (DE)

( * ) Notice: Subject to any disclaimer, the term of this patent is extended or adjusted under 35 U.S.C. 154(b) by 276 days.

(21) Appl. No.: 14/368,234

(22) PCT Filed: Dec. 21, 2012

(86) PCT No.: PCT/EP2012/076632
§ 371 (c)(1),
(2) Date: Jun. 23, 2014

(87) PCT Pub. No.: WO2013/092999
PCT Pub. Date: Jun. 27, 2013

(65) Prior Publication Data
US 2014/0373612 A1 Dec. 25, 2014

(30) Foreign Application Priority Data
Dec. 23, 2011 (DE) .......... 10 2011 089 898

(51) Int. Cl.
*F02M 35/10* (2006.01)
*G01F 1/684* (2006.01)
(Continued)

(52) U.S. Cl.
CPC ...... *F02M 35/10386* (2013.01); *F02D 41/187* (2013.01); *G01F 1/6842* (2013.01); *G01F 1/6845* (2013.01); *G01F 1/692* (2013.01); *G01F 1/696* (2013.01); *G01F 1/78* (2013.01); *G01F 5/00* (2013.01); *G01M 15/042* (2013.01); *F02D 41/042* (2013.01); *F02D 41/062* (2013.01)

(58) Field of Classification Search
CPC ............ F02D 41/187; F02D 41/0002; G01F 1/6845; G01F 1/78; F02M 35/10386
USPC ........................................ 73/114.32
See application file for complete search history.

(56) References Cited

U.S. PATENT DOCUMENTS 6,672,153 B2 * 1/2004 Igarashi ............... G01F 1/6983
73/114.34
6,860,149 B2 * 3/2005 Igarashi ............... G01F 1/6983
73/114.34
(Continued)

FOREIGN PATENT DOCUMENTS

CN       1459020      11/2003
CN     101156050       4/2008
(Continued)

*Primary Examiner* — Freddie Kirkland, III
(74) *Attorney, Agent, or Firm* — Cozen O'Connor

(57) ABSTRACT

A method for operating an air mass sensor arranged in the intake section of an internal combustion engine and configured to measure the mass of the air flowing through the intake section includes the air mass sensor detecting a stationary state of the internal combustion engine using an element for evaluating measurement signals generated by an air mass sensor element, and, in response to detection of a stationary state, switching the air mass sensor element into a second operating mode that reduces contamination of the air mass sensor element. The second operating mode permits at least one measurement of the air mass flowing in the intake section, as a result of which the air mass sensor itself detects a starting of the internal combustion engine using the element for evaluating the measurement signals generated by the air mass sensor element.

4 Claims, 2 Drawing Sheets

(51) Int. Cl.
  *G01F 1/692* (2006.01)
  *G01F 1/696* (2006.01)
  *G01F 5/00* (2006.01)
  *F02D 41/18* (2006.01)
  *G01F 1/78* (2006.01)
  *G01M 15/04* (2006.01)
  *F02D 41/04* (2006.01)
  *F02D 41/06* (2006.01)

(56) References Cited

U.S. PATENT DOCUMENTS

| | | | |
|---|---|---|---|
| 7,370,518 B2 * | 5/2008 | Morino | B08B 5/00 73/118.02 |
| 7,444,852 B2 * | 11/2008 | Fokkelman | F02D 41/187 73/1.01 |
| 9,134,159 B2 * | 9/2015 | Knittel | G01F 1/6845 |
| 2004/0035195 A1 | 2/2004 | Igarashi et al. | |
| 2011/0040477 A1 | 2/2011 | Eser et al. | |

FOREIGN PATENT DOCUMENTS

| | | |
|---|---|---|
| CN | 101171413 | 4/2008 |
| CN | 102016269 | 4/2011 |
| DE | 44 07 209 | 9/1995 |
| DE | 44 07 209 A1 | 9/1995 |
| DE | 102 32 072 | 2/2004 |
| DE | 10 2008 020182 | 11/2009 |
| DE | 10 2008 020182 A1 | 11/2009 |
| DE | 10 2008 052 394 | 4/2010 |
| JP | 07-317584 | 12/1995 |
| JP | H07 317584 A | 12/1995 |

\* cited by examiner

METHOD FOR OPERATING AN AIR MASS SENSOR

CROSS-REFERENCE TO RELATED APPLICATIONS

This is a U.S. national stage of application No. PCT/EP2012/076632, filed on 21 Dec. 2012, which claims priority to the German Application No. 10 2011 089 898.0, filed 23 Dec. 2011, the content of both incorporated herein by reference.

BACKGROUND OF THE INVENTION

1. Field of the Invention

The invention relates to a method for operating an air mass sensor arranged in the intake section of an internal combustion engine which measures the mass of the air mass flowing through the intake section. The air mass sensor has an air mass sensor element that is part of an application-specific integrated circuit constructed as a micro-electromechanical system, wherein the application-specific integrated circuit has at least one element for evaluating the measurement signals generated by the air mass sensor element.

2. Related Art

Such air mass sensors are used, for example, in motor vehicles for determining the air mass sucked in by an internal combustion engine. Combustion can be optimized by an engine controller on the basis of the most reliable possible information about a sucked-in air mass, to the effect that a quantity of fuel matched precisely to the air mass is fed into the respective combustion chambers. As result, better utilization of energy is thereby achieved with reduced emission of pollutants.

DE 44 07 209 A1 discloses an air mass sensor plugged into an intake duct in order to determine an air mass, wherein a defined portion of the total flow flows through the air mass sensor. For this purpose, the air mass sensor is embodied as a plug-in duct air mass sensor and comprises a sensor element arranged in a measurement duct, electronics for this sensor element arranged in a housing and an outlet duct on the other side of the sensor element. For a space-saving arrangement, the specified ducts or air-conducting paths are embodied in the shape of a U, S or C, forming a device having an overall compact design as a plug-in element.

Modern air mass sensor elements, which are constructed as micro-electromechanical systems (MEMS), operate very precisely and quickly. In addition, they can be manufactured cost-effectively. Unfortunately, air mass sensor elements that are designed as a micro-electromechanical system are very susceptible to contamination on the surface of the sensor element. The surface of the sensor element is in direct contact with the air flow and particles present in the air flow can damage the surface of the sensor element. This contamination problem is significantly aggravated by modern motor vehicles with an automatic start/stop system. If a hot internal combustion engine is shut down, oil droplets migrate to a greater degree from the internal combustion engine into the intake section. On the one hand, what is referred to as a chimney effect occurs, which gives rise to an air flow from the hot internal combustion engine to the cold region of the air filter in the intake section and in which, on the other hand, the thermophoresis or thermodiffusion drives the oil droplets from the hot internal combustion engine toward the cold air filter box.

The movement of particles owing to a temperature gradient within a fluid is referred to as thermophoresis, thermodiffusion or the Ludwig-Soret effect. In most cases, the movement occurs from hot to cold, but a movement toward the hotter region is also possible depending on the type of particles and the fluid. Thermophoresis occurs in all materials, and this effect can be clearly observed in the case of aerosols, such as oil droplets in the air, and also in the case of dust particles in air.

Without temperature gradient, air molecules impact on average uniformly from all sides against a dust particle or an oil droplet in air. As a result, the dust particle or oil droplet moves according to Brown's Laws and its movement is statistical and nondirectional and on average the dust particle or oil droplet does not move away from its location over a large number of Brownian impacts. If the dust particle or the oil droplet is, however, located in a temperature gradient, molecules impact faster on the hot side than on the cold side, and the particle therefore experiences a net impulse in the direction of the cold side. The movement is still statistical, but the dust particle or oil droplet moves on average for a longer time in the direction of the cold region of the air.

SUMMARY OF THE INVENTION

An object of the present invention is to specify a method for operating an air mass sensor which, in particular in the case of vehicles with an automatic start/stop system, reduces the contamination of the air mass sensor element.

According to an aspect of the invention, the air mass sensor detects a stationary state of the internal combustion engine using the element for evaluating the measurement signals generated by the air mass sensor element, and in response switches the air mass sensor element into a second operating mode, which reduces contamination of the air mass sensor element, wherein the second operating mode still permits at least one measurement of the air mass flowing in the intake section, as a result of which the air mass sensor itself detects the starting of the internal combustion engine using the element for evaluating the measurement signals generated by the air mass sensor element and using the measurement signals of the air mass sensor element, and in response switches the air mass sensor element into a first operating mode which permits the air mass sensor element to measure the air mass flowing through the intake section with high accuracy. With the proposed method, the air mass sensor is capable of independently differentiating between a running and a stationary internal combustion engine and of adapting correspondingly to the situation with two different operating modes. In a first operating mode, the air mass sensor element, which is embodied using MEMS technology, measures the air mass flow in the intake section with high accuracy, and in the second operating mode it protects the air mass sensor element against contamination by oil droplets or dust, but the air mass sensor element continues to be able to measure the air mass flow even if only with low resolution. The switching to and from between the first operating mode, in which the air mass sensor can measure the air mass flow in the intake section with high accuracy, and the second operating mode, in which the air mass sensor stays in a self-protection function but is nevertheless not completely switched off, occurs completely independently of the engine control unit and exclusively using the application-specific integrated circuit and the element for evaluating the measured values generated by the air mass sensor element and within the air mass sensor itself. Such an intelligent air mass sensor relieves, on the one hand, the engine control unit and, on the other hand, the data bus between the air mass sensor and the engine control unit.

Furthermore, the air mass sensor operated according to the method according to the invention switches to and from very quickly between the two operating modes, which would not be the case if the engine control unit were integrated.

It is advantageous if the element for evaluating the measurement signals generated by the air mass sensor element is arranged in the housing of the air mass sensor. As a result, the air mass sensor becomes independent of the engine control unit.

If the element for evaluating the measurement signals generated by the air mass sensor element is part of the application-specific integrated circuit, it can be manufactured together with the air mass sensor element without incurring additional costs.

In one development of the invention, the air mass sensor detects a stationary state of the internal combustion engine using the element for evaluating the measurement signals generated by the air mass sensor element, if no mass flow or a constant reverse flow or a constant forward flow less than the idling mass flow is measured.

BRIEF DESCRIPTION OF THE DRAWINGS

Further features and advantages of the invention are specified by means of a description of an exemplary embodiment with reference to the figures of the drawings. Identical terms and reference symbols are used for identical components in all the various figures, of which.

DETAILED DESCRIPTION OF THE PRESENTLY PREFERRED EMBODIMENTS

Figure 1:
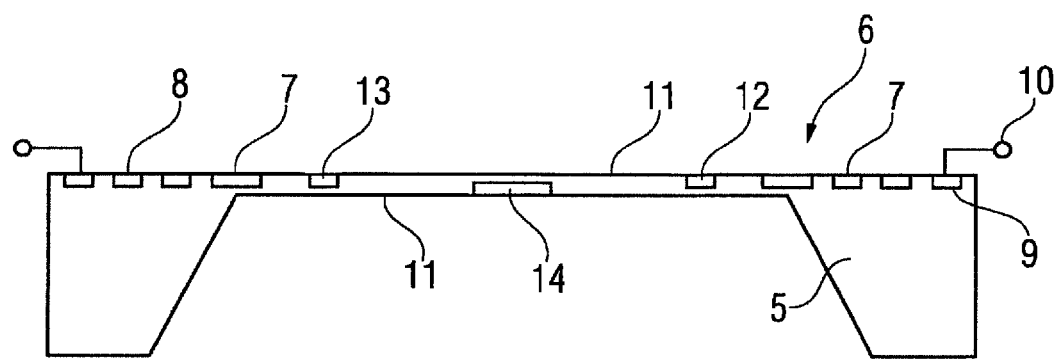
FIG. 1 shows an air mass sensor element.

FIG. 1 shows an air mass sensor element 5. The air mass sensor element 5 is embodied as a micro-electromechanical system (MEMS) on a single silicon chip. The air mass sensor element 5 operates according to the differential temperature method and therefore determines the mass of the quantity of air flowing past. For this purpose, a first temperature sensor element 12 and a second temperature sensor element 13 are embodied on a thin diaphragm 11. The first and the second temperature sensor elements 12, 13 are positioned at different locations on the surface of the diaphragm 11. A heating element 14 is arranged between the first temperature sensor element 12 and the second temperature sensor element 13. The first temperature sensor element 12 and the second temperature sensor element 13 as well the heating element 14 are parts of an application-specific integrated circuit 6. In addition, evaluation electronics 7, which evaluate the measurement signals of the temperature sensor elements 12, 13 immediately and generate into a signal which is proportional to the air mass flow, can be integrated onto the air mass sensor element 5, which is constructed as a micro-electromechanical system. However, the evaluation electronics 7 can be arranged in a downstream electronic device in the housing 18 of the air mass sensor 1. It is important here that the engine control unit 16 is relieved of the function of evaluating the measurement signals of the air mass sensor element 5. The engine control unit 16 receives the completely processed measurement results from the air mass sensor 1 as a digital signal. The information about the air mass flow is then passed on to an engine control unit 16 (illustrated in FIG. 2) via connection elements 9 and connection wires 10.

Figure 2:
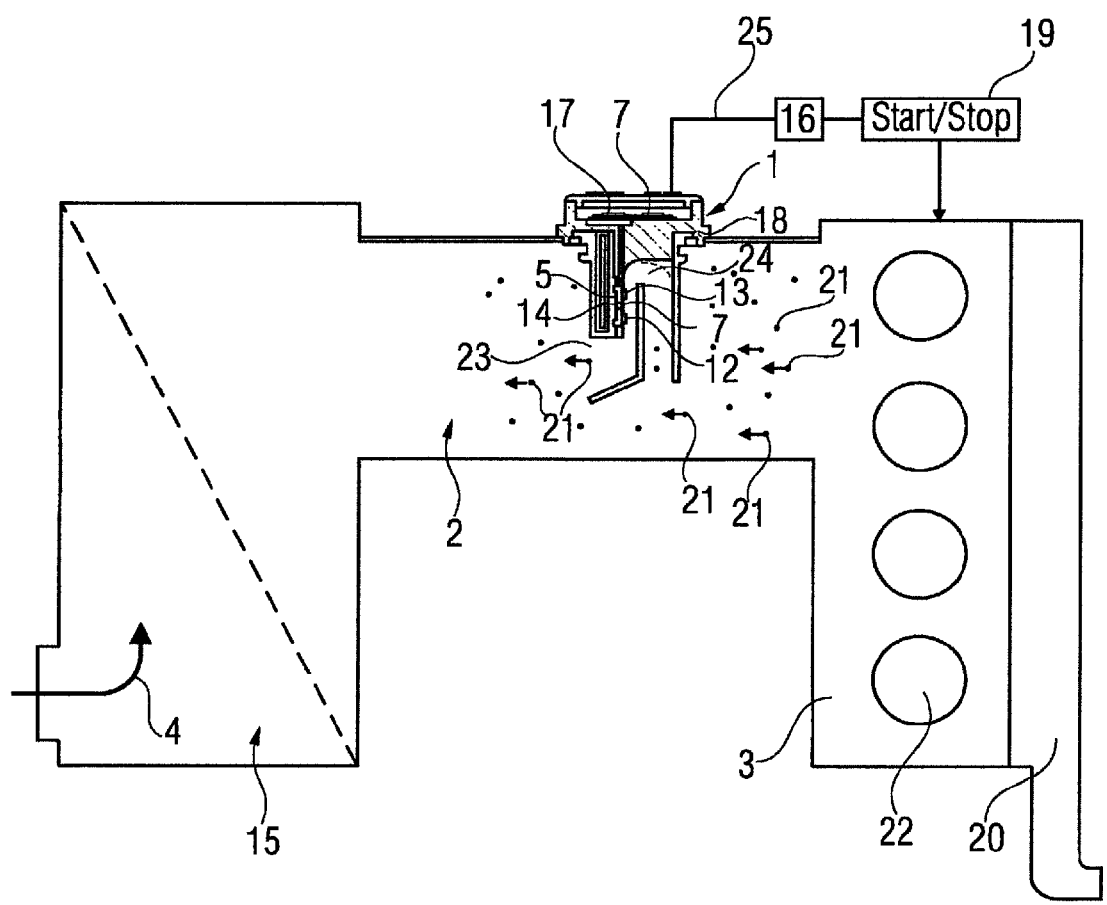
FIG. 2 shows an air mass sensor which is integrated into an intake section as a plug-in finger.

FIG. 2 shows the air mass sensor element 5 embodied as a micro-electromechanical system (MEMS) and arranged in an air mass sensor 1 integrated as a plug-in finger into an intake section 2 of an internal combustion engine 3. When the internal combustion engine 3 is running, the air mass flow 4 reaches the inlet opening 4 of the air mass sensor 1 and enters the auxiliary tube 24. The first temperature sensor element 12 and the second temperature sensor element 13 can be seen on the surface of the thin diaphragm 11. The heating element 14 is arranged between the first temperature sensor element 12 and the second temperature sensor element 13. The air mass flow 4 firstly reaches the first temperature sensor element 12, then flows over the heating element 14, before then reaching the second temperature sensor element 13. When the internal combustion engine 3 is running, the air mass flow 4 in the intake section 2 can be calculated with high accuracy on the basis of the measured values of the first temperature sensor element 12 and the second temperature sensor element 13 and possibly using the temperature of the heating element 14. The measurement and calculation of the air mass flow 4 occur exclusively in the air mass sensor 1. This information is then passed on to the engine control unit 16 via a suitable data path 25. With this information the engine control unit 16 can calculate the optimum quantity of fuel that is to be fed to the combustion chambers 22 of the internal combustion engine 3.

Modern motor vehicles increasingly have an automatic start/stop system 19, which is coupled to the engine control unit 16 and automatically deactivates the internal combustion engine 3 when the motor vehicle is in a stationary state.

If the motor vehicle is then to start up again, because, for example, a traffic light is at "green", the internal combustion engine 3 is automatically started, for example when the clutch is activated. This is a measure for saving fuel that has now become widespread in motor vehicles. When the internal combustion engine 3 stops, oil droplets 21 diffuse out of the hot engine oil and also pass into the intake section 2. As a result of the thermophoresis effect described above and the chimney effect, the oil droplets 21 in the intake section 2 move from the hot internal combustion engine 3 in the direction of the cold air filter 15. In the process the oil droplets 21 also pass through the air mass sensor 1 and force their way as far as the air mass sensor element 5 via the auxiliary tube 24 of the air mass sensor 1. The air mass sensor element 5 is therefore contaminated by the oil droplets 21, which has an extremely negative effect on the measuring properties of the air mass sensor element 5. An air mass sensor element 5 that is severely contaminated by oil droplets 21 may severely falsify the measurement results, and therefore it is extremely important to protect the air mass sensor element 5 against contamination. In order to protect the air mass sensor element 5, an element 7 for evaluating the measurement signals generated by the air mass sensor element 5 is arranged in the air mass sensor 1, the air mass sensor element 5 detecting a stationary state of the internal combustion engine 3 and in response switching the air mass sensor element 5 into a second operating mode that reduces contamination of the air mass sensor element 5. It is important that in the second operating mode the air mass sensor element 5 is still able to carry out a measurement of the air mass flowing in the intake section, at least with a low resolution. The stationary state of the internal combustion engine 3 is detected by the element 7 for evaluating the signals of the air mass sensor element 5 if air mass flow 4 can no longer be measured or a constant reverse flow of the air mass 4 is detected or a low and constant forward flow of the air mass 4, which is less than the known idling mass flow of the internal combustion engine 3, is detected. During idling of the internal combustion engine 3, owing to the dynamics mass flows of less than zero or less than the idling mass flow are also briefly obtained, since the air column in the intake section 3 reverberates with the corresponding engine speed. The typical oscillations of an air column are between 20 and 33 Hertz. If, for example, a negative or a very small air mass flow is measured for 50 milliseconds, the air mass sensor 1 detects that the internal combustion engine 3 is in the stationary state. In order to prevent contamination of the air mass sensor element 5 with oil droplets 21, the power of the electrical heating element 14 is then reduced. For example, the temperature of 100° C. generated by the heating element 14 can be reduced to approximately 20° C. overtemperature. The term overtemperature denotes the temperature that is above the temperature of the ambient air, that is to say the temperature of the sucked-in air mass 4. For example, the temperature of the sucked-in air mass 4 can be 15° C., and in order to obtain an overtemperature of 20° C. the electric heating element 14 is set to 35° C. In this state, no oil droplets 21 or only very few oil droplets 21 are deposited on the air mass sensor element 5. Nevertheless, the air mass sensor 1 is able to measure an air mass flow 4, even if only with relatively poor resolution, when the internal combustion engine starts, since the heating element 14 has only a relatively low temperature of 35° C. If the air mass sensor 1 with the application-specific, integrated circuit 6 and the element 7 for evaluating the measurement signals generated by the air mass sensor element 5 detects now that the internal combustion engine 3 has been activated again, the application-specific, integrated circuit 6 switches the air mass sensor element 5 into a first operating mode, which permits it to measure the air mass 4 flowing through the intake section 2 with high accuracy. This first operating mode, in which the air mass flowing through the intake section 3 can be measured with high accuracy, is achieved, for example, if the heating element 14 has reached a temperature of approximately 100° C. The air mass sensor 1 operated according to the method according to the invention is therefore able to detect the stationary state of the internal combustion engine 3 completely independently and then to switch into a mode of rest, in that the air mass sensor 1 is able both to detect the starting of the internal combustion engine 3 and to stay in a self-protection mode that ensures that the air mass sensor element 5 is not unnecessarily contaminated by oil droplets 21 that have penetrated the intake section 2 owing to the thermophoresis and the chimney effect. The switching to and from between the first operating mode, in which the air mass sensor 1 can measure the air mass in the intake section 2 with high accuracy, and the second operating mode, in which the air mass sensor stays in a self-protection function but is nevertheless not completely switched off, occurs completely independently of the engine control unit 16 and exclusively by the application-specific integrated circuit 6 and the element 7 for evaluating the measured values generated by the air mass sensor element 5 and within the air mass sensor 1 itself. Such an intelligent air mass sensor 1 relieves, on the one hand, the engine control unit 16 and, on the other hand, the data bus 25 between the air mass sensor 1 and the engine control unit 16.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating an air mass sensor (1) arranged in the intake section (2) of an internal combustion engine (3) and configured to measure a mass (4) of air flowing through the intake section (2), the air mass sensor (1) having an air mass sensor element (5) that is part of an application specific integrated circuit (6) constructed as a micro-electromechanical system, the air mass sensor (1) having at least one element (7) configured to evaluate measurement signals generated by the air mass sensor element (5), comprising:

the air mass sensor (1) detecting a stationary state of the internal combustion engine using the element (7) for evaluating the measurement signals generated by the air mass sensor element (5), and;

in response to the detection of the stationary state, switching the air mass sensor element (5) into a second operating mode that reduces contamination of the air mass sensor element (5), the second operating mode permitting at least one measurement of the air mass (4) flowing in the intake section (2), as a result of which the air mass sensor (1) itself detects a starting of the internal combustion engine (3) using the element (7) for evaluating the measurement signals generated by the air mass sensor element (5) and using the measurement signals of the air mass sensor element (5), and, in response, switches the air mass sensor element (5) into a first operating mode, which permits said air mass sensor element (5) to measure the air mass (4) flowing through the intake section (2) with high accuracy.

2. The method for operating an air mass sensor (1) as claimed in claim 1, wherein the element (7) is arranged in a housing (18) of the air mass sensor (1).

3. The method for operating an air mass sensor (1) as claimed in claim 1, wherein the element (7) is a part of the application specific integrated circuit (6).

4. The method for operating an air mass sensor (1) as claimed in claim 1, further comprising the air mass sensor (1) detecting a stationary state of the internal combustion engine using the element (7), if no mass flow or a constant reverse flow or a constant forward flow less than an idling mass flow is measured.

* * * * *